Aug. 25, 1931.   H. C. LORD   1,820,750

FLEXIBLE COUPLING

Filed March 28, 1928

INVENTOR.
Hugh C Lord

Patented Aug. 25, 1931

1,820,750

UNITED STATES PATENT OFFICE

HUGH C. LORD, OF ERIE, PENNSYLVANIA

FLEXIBLE COUPLING

Application filed March 28, 1928. Serial No. 265,279.

The present invention is designed to utilize flexible couplings in which the rubber is put under initial tension and in which the movement to which the coupling is subjected has its maximum in an axial direction. In carrying out the invention I utilize an outer annular member, a central member, and an intervening wall of rubber preferably secured to the outer and inner members by surface bonding during vulcanization under heat, the shrinkage of the rubber in cooling putting the rubber under initial tension. With such a joint the resistance to radial movement is several times, usually five or six times, greater in a radial direction than in an axial direction, and in very many situations a minimum of radial movement is desired with a comparative freedom of axial movement and in such situations this joint has peculiar advantages. Features and details of the invention will appear more fully from the specification and claims.

Preferred embodiments of the invention are illustrated in the accompanying drawings as follows—

Figure 1:
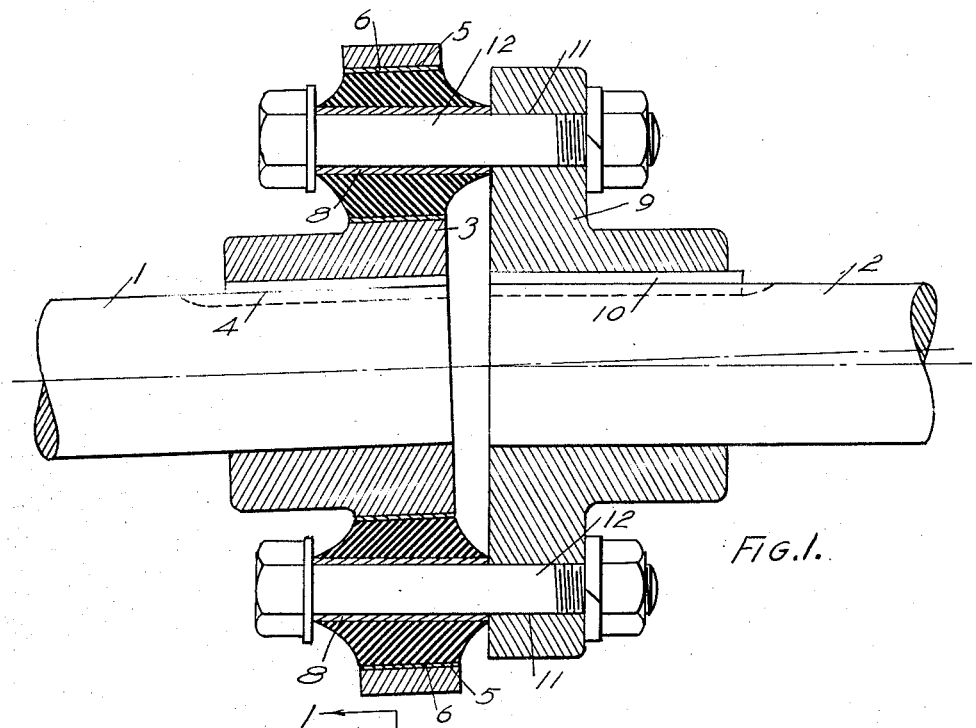
Figure 2:
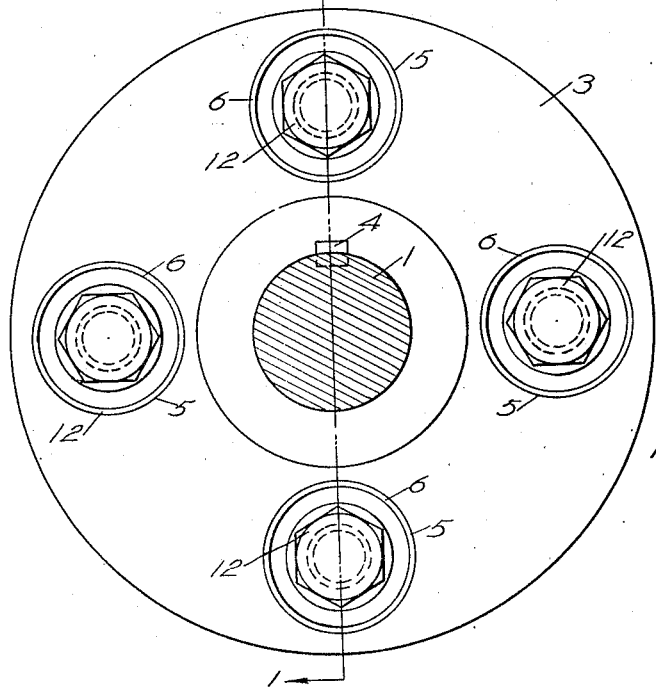

Fig. 1 shows a central section of a flexible coupling on the line 1—1 in Fig. 2.

Fig. 2 an end view of the coupling.

1 and 2 mark shafts, and 3 a coupling plate keyed to the shaft 1 by a key 4. The shaft is provided with a series of openings 5 in which are pressed with a secure fit outer shells 6. The rubber wall is surface bonded to the shell 6 at its outer periphery and is surface bonded to a sleeve, or central member 8 at the inner periphery of the wall. This bonding is preferably done during vulcanization under heat so that when the rubber cools the shrinkage of the rubber puts this rubber wall under initial tension. There are preferably a plurality of these points in the plate 3. A coupling disc 9 is secured to the shaft 2 by a key 10. It is provided with a series of openings 11 which are adapted to register with the openings through the sleeves 8 and bolts 12 extend through the sleeves and openings 11. The nuts set up the bolts so as to clamp the sleeves and lock them with the plate 9. In consequence the outer members of the joint are fixed with the shaft 1 and the inner members of the joint are fixed with the shaft 2. The shafts are shown out of alinement. The flexible joints are of sufficient capacity so that under the normal load their radial deflection is very slight but the deflection of the shafts results in a maximum normal movement in an axial direction of the joint. Inasmuch as it is desirable to have as little resistance in the flexible joint in an axial direction as is possible and still maintain a unitary connection these joints are peculiarly fitted for the purpose in that their resistance to axial movement is so small compared with the radial resistance so that the joints are very resistant to radial movement—both the compression and tension sides of the joint in a radial direction supplementing each other in resisting this movement, while the axial movement moves all the rubber uniformly and sustains the load much as a hammock sustains its load all the rubber being uniformly stretched and distorted with such movement. The result is that a flexible coupling operating with these joints even with quite a mis-alinement of the shafts operates without undue strain on the bearings and while there is a slight cushioning under the torsional load it is not sufficient to be objectionable, in fact, in some cases may be desirable.

What I claim as new is:—

1. In a flexible coupling, the combination of two rotative shafts comprising an off-center joint having its outer member fixed with one shaft and its inner member fixed with the other shaft, and a rubber wall under initial tension between the outer and inner members.

2. In a flexible coupling, the combination of two rotative shafts comprising an off-center joint having its outer member fixed with one shaft and its inner member fixed with the other shaft; and a rubber wall under initial tension between the outer and inner members and secured thereto by surface bonding.

3. In a flexible coupling, the combination of two rotative shafts comprising an off-center joint having its outer member fixed with one shaft and its inner member fixed with the other shaft; and a rubber wall under initial tension between the outer and inner members and secured thereto by surface bonding during vulcanization under heat.

4. In a flexible coupling, the combination of two rotative shafts comprising an off-center joint having its outer member fixed with one shaft and its inner member fixed with the other shaft, and a rubber wall under initial tension between the outer and inner members, the angularity of the shafts subjecting the members in the normal operation to a maximum relative movement in an axial direction.

5. In a flexible coupling, the combination of two rotative shafts comprising an off-center joint having its outer member fixed with one shaft and its inner member fixed with the other shaft; and a rubber wall under initial tension between the outer and inner members and secured thereto by surface bonding, the angularity of the shafts subjecting the members in the normal operation to a maximum relative movement in an axial direction.

6. In a flexible coupling, the combination of two rotative shafts comprising an off-center joint having its outer member fixed with one shaft and its inner member fixed with the other shaft; and a rubber wall under initial tension between the outer and inner members and secured thereto by surface bonding during vulcanization under heat, the angularity of the shafts subjecting the members in the normal operation to a maximum relative movement in an axial direction.

7. In a flexible coupling, the combination of two rotative shafts comprising an off-center joint having its outer member fixed with one shaft and its inner member fixed with the other shaft; and a rubber wall between the outer and inner members, the rubber wall having its outer and inner surfaces locked with the inner and outer surfaces of the outer and inner members respectively.

8. In a flexible coupling, the combination of two rotative shafts comprising an off-center joint having its outer member fixed with one shaft and its inner member fixed with the other shaft; and a rubber wall between the outer and inner members, the rubber wall having its outer and inner surfaces locked with the inner and outer surfaces of the outer and inner members respectively, the locking of one of said surfaces being by vulcanization.

9. In a flexible coupling, the combination of two rotative shafts comprising an off-center joint having its outer member fixed with one shaft and its inner member fixed with the other shaft; and a rubber wall between the outer and inner members, the rubber wall having its outer and inner surfaces locked with the inner and outer surfaces of the outer and inner members respectively, the angularity of the shafts subjecting the members in the normal operation to a maximum relative movement in an axial direction.

In testimony whereof I have hereunto set my hand.

HUGH C. LORD.